US012641142B2

(12) United States Patent
Amidei et al.

(10) Patent No.: US 12,641,142 B2
(45) **Date of Patent: *May 26, 2026**

(54) SYSTEMS AND METHODS FOR QUICK START-UP OF PLAYBACK

(71) Applicant: DIVX, LLC, San Diego, CA (US)

(72) Inventors: William David Amidei, San Diego, CA (US); Jason Braness, San Diego, CA (US); Cristina Dobrin, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 18/743,814

(22) Filed: Jun. 14, 2024

(65) Prior Publication Data

US 2024/0414221 A1      Dec. 12, 2024

Related U.S. Application Data

(63) Continuation of application No. 18/068,395, filed on Dec. 19, 2022, now Pat. No. 12,041,113, which is a
(Continued)

(51) Int. Cl.
*H04L 67/02* (2022.01)
*H04L 9/40* (2022.01)
(Continued)

(52) U.S. Cl.
CPC .......... *H04L 67/02* (2013.01); *H04L 63/0428* (2013.01); *H04L 63/062* (2013.01);
(Continued)

(58) Field of Classification Search
None
See application file for complete search history.

(56) References Cited

U.S. PATENT DOCUMENTS 5,361,332 A    11/1994  Yoshida et al.
5,400,401 A    3/1995   Wasilewski et al.
(Continued)

FOREIGN PATENT DOCUMENTS

CA         2237293 A1    7/1997
CN       103493495 A     1/2014
(Continued)

OTHER PUBLICATIONS

"IBM Closes Cryptolopes Unit,", CNET News, Dec. 17, 1997, Printed on Apr. 25, 2014 from http://news.cnet.com/IBM-closes-Cryptolopes-unit/2100-1001_3206465.html, 3 pgs.
(Continued)

*Primary Examiner* — Brandon Hoffman
(74) *Attorney, Agent, or Firm* — KPPB LLP

(57) ABSTRACT

Systems and methods for quick start-up of playback in accordance with embodiments of the invention are disclosed. Media content may be encoded in a plurality of alternative streams and a quick start-up stream. The quick start-up stream may include media content that is encoded at a lower quality that the alternative streams and may be encrypted with a different, less secure encryption process than that of the alternative streams. During a start-up of playback, the playback device streams the media content from a quick start-up stream until a metric, such as a decryption key for the alternative streams is met. The device then streams the media content from the alternative streams in response to the metric being met.

28 Claims, 6 Drawing Sheets

Related U.S. Application Data continuation of application No. 16/932,559, filed on Jul. 17, 2020, now Pat. No. 11,539,780, which is a continuation of application No. 16/101,339, filed on Aug. 10, 2018, now Pat. No. 10,721,285, which is a continuation of application No. 15/085,598, filed on Mar. 30, 2016, now Pat. No. 10,075,292.

(51) Int. Cl.

| | |
|---|---|
| *H04L 65/612* | (2022.01) |
| *H04L 65/613* | (2022.01) |
| *H04L 65/70* | (2022.01) |
| *H04L 65/75* | (2022.01) |
| *H04L 65/752* | (2022.01) |
| *H04L 65/756* | (2022.01) |
| *H04N 21/2343* | (2011.01) |
| *H04N 21/2347* | (2011.01) |
| *H04N 21/254* | (2011.01) |
| *H04N 21/4402* | (2011.01) |
| *H04N 21/462* | (2011.01) |
| *H04N 21/6334* | (2011.01) |
| *H04N 21/643* | (2011.01) |
| *H04N 21/845* | (2011.01) |

(52) U.S. Cl.
CPC .......... *H04L 65/612* (2022.05); *H04L 65/613* (2022.05); *H04L 65/70* (2022.05); *H04L 65/75* (2022.05); *H04L 65/752* (2022.05); *H04L 65/756* (2022.05); *H04L 65/762* (2022.05); *H04N 21/23439* (2013.01); *H04N 21/2347* (2013.01); *H04N 21/2541* (2013.01); *H04N 21/44029* (2013.01); *H04N 21/4621* (2013.01); *H04N 21/63345* (2013.01); *H04N 21/64322* (2013.01); *H04N 21/8456* (2013.01); *H04L 2209/60* (2013.01)

(56) References Cited

U.S. PATENT DOCUMENTS

| | | | |
|---|---|---|---|
| 5,404,436 | A | 4/1995 | Hamilton |
| 5,574,785 | A | 11/1996 | Ueno et al. |
| 5,589,993 | A | 12/1996 | Naimpally et al. |
| 5,600,721 | A | 2/1997 | Kitazato |
| 5,621,794 | A | 4/1997 | Matsuda et al. |
| 5,642,338 | A | 6/1997 | Fukushima et al. |
| 5,715,403 | A | 2/1998 | Stefik |
| 5,717,816 | A | 2/1998 | Boyce et al. |
| 5,805,700 | A | 9/1998 | Nardone et al. |
| 5,813,010 | A | 9/1998 | Kurano et al. |
| 5,854,873 | A | 12/1998 | Mori et al. |
| 5,907,658 | A | 5/1999 | Murase et al. |
| 5,923,869 | A | 7/1999 | Kashiwagi et al. |
| 6,002,834 | A | 12/1999 | Hirabayashi et al. |
| 6,009,237 | A | 12/1999 | Hirabayashi et al. |
| 6,016,381 | A | 1/2000 | Taira et al. |
| 6,031,622 | A | 2/2000 | Ristow et al. |
| 6,038,257 | A | 3/2000 | Brusewitz et al. |
| 6,057,832 | A | 5/2000 | Lev et al. |
| 6,065,050 | A | 5/2000 | DeMoney |
| 6,141,754 | A | 10/2000 | Choy |
| 6,155,840 | A | 12/2000 | Sallette |
| 6,195,388 | B1 | 2/2001 | Choi et al. |
| 6,266,483 | B1 | 7/2001 | Okada et al. |
| 6,282,320 | B1 | 8/2001 | Hasegawa et al. |
| 6,320,905 | B1 | 11/2001 | Konstantinides |
| 6,351,538 | B1 | 2/2002 | Uz |
| 6,373,803 | B2 | 4/2002 | Ando et al. |
| 6,415,031 | B1 | 7/2002 | Colligan et al. |
| 6,445,877 | B1 | 9/2002 | Okada et al. |
| 6,453,115 | B1 | 9/2002 | Boyle |
| 6,453,116 | B1 | 9/2002 | Ando et al. |
| 6,504,873 | B1 | 1/2003 | Vehvilaeinen |
| 6,512,883 | B2 | 1/2003 | Shim et al. |
| 6,594,699 | B1 | 7/2003 | Sahai et al. |
| 6,654,933 | B1 | 11/2003 | Abbott et al. |
| 6,658,056 | B1 | 12/2003 | Duruöz et al. |
| 6,671,408 | B1 | 12/2003 | Kaku |
| 6,690,838 | B2 | 2/2004 | Zhou |
| 6,724,944 | B1 | 4/2004 | Kalevo et al. |
| 6,751,623 | B1 | 6/2004 | Basso et al. |
| 6,771,703 | B1 | 8/2004 | Oguz et al. |
| 6,807,306 | B1 | 10/2004 | Girgensohn et al. |
| 6,813,437 | B2 | 11/2004 | Ando et al. |
| 6,850,252 | B1 | 2/2005 | Hoffberg |
| 6,859,496 | B1 | 2/2005 | Boroczky et al. |
| 6,871,006 | B1 | 3/2005 | Oguz et al. |
| 6,912,513 | B1 | 6/2005 | Candelore |
| 6,931,531 | B1 | 8/2005 | Takahashi |
| 6,956,901 | B2 | 10/2005 | Boroczky et al. |
| 6,957,350 | B1 | 10/2005 | Demos |
| 6,970,564 | B1 | 11/2005 | Kubota et al. |
| 6,983,079 | B2 | 1/2006 | Kim |
| 7,006,757 | B2 | 2/2006 | Ando et al. |
| 7,007,170 | B2 | 2/2006 | Morten |
| 7,020,287 | B2 | 3/2006 | Unger |
| 7,023,924 | B1 | 4/2006 | Keller et al. |
| 7,151,832 | B1 | 12/2006 | Fetkovich et al. |
| 7,188,183 | B1 | 3/2007 | Paul et al. |
| 7,197,234 | B1 | 3/2007 | Chatterton |
| 7,212,726 | B2 | 5/2007 | Zetts |
| 7,242,772 | B1 | 7/2007 | Tehranchi |
| 7,274,861 | B2 | 9/2007 | Yahata et al. |
| 7,295,673 | B2 | 11/2007 | Grab et al. |
| 7,349,886 | B2 | 3/2008 | Morten et al. |
| 7,352,956 | B1 | 4/2008 | Winter et al. |
| 7,382,879 | B1 | 6/2008 | Miller |
| 7,397,853 | B2 | 7/2008 | Kwon et al. |
| 7,400,679 | B2 | 7/2008 | Kwon et al. |
| 7,418,132 | B2 | 8/2008 | Hoshuyama |
| 7,421,411 | B2 | 9/2008 | Kontio et al. |
| 7,457,415 | B2 | 11/2008 | Reitmeier et al. |
| 7,478,325 | B2 | 1/2009 | Foehr |
| 7,499,930 | B2 | 3/2009 | Naka et al. |
| 7,546,641 | B2 | 6/2009 | Robert et al. |
| 7,639,921 | B2 | 12/2009 | Seo et al. |
| 7,640,435 | B2 | 12/2009 | Morten |
| 7,689,510 | B2 | 3/2010 | Lamkin et al. |
| 7,711,052 | B2 | 5/2010 | Hannuksela et al. |
| 7,779,097 | B2 | 8/2010 | Lamkin et al. |
| 7,853,980 | B2 | 12/2010 | Pedlow, Jr. et al. |
| 7,864,186 | B2 | 1/2011 | Robotham et al. |
| 7,945,143 | B2 | 5/2011 | Yahata et al. |
| 7,974,714 | B2 | 7/2011 | Hoffberg |
| 7,991,156 | B1 | 8/2011 | Miller |
| 8,023,562 | B2 | 9/2011 | Zheludkov et al. |
| 8,046,453 | B2 | 10/2011 | Olaiya |
| 8,054,880 | B2 | 11/2011 | Yu et al. |
| 8,069,260 | B2 | 11/2011 | Speicher et al. |
| 8,131,875 | B1 | 3/2012 | Chen |
| 8,169,916 | B1 | 5/2012 | Pai et al. |
| 8,225,061 | B2 | 7/2012 | Greenebaum |
| 8,233,768 | B2 | 7/2012 | Soroushian et al. |
| 8,243,924 | B2 | 8/2012 | Chen et al. |
| 8,249,168 | B2 | 8/2012 | Graves |
| 8,270,473 | B2 | 9/2012 | Chen et al. |
| 8,270,819 | B2 | 9/2012 | Vannier |
| 8,286,213 | B2 | 10/2012 | Seo |
| 8,289,338 | B2 | 10/2012 | Priyadarshi et al. |
| 8,291,460 | B1 | 10/2012 | Peacock |
| 8,311,115 | B2 | 11/2012 | Gu et al. |
| 8,312,079 | B2 | 11/2012 | Newsome et al. |
| 8,321,556 | B1 | 11/2012 | Chatterjee et al. |
| 8,369,421 | B2 | 2/2013 | Kadono et al. |
| 8,386,621 | B2 | 2/2013 | Park |
| 8,412,841 | B1 | 4/2013 | Swaminathan et al. |
| 8,456,380 | B2 | 6/2013 | Pagan |
| 8,472,792 | B2 | 6/2013 | Butt |
| 8,515,265 | B2 | 8/2013 | Kwon et al. |
| 8,516,529 | B2 | 8/2013 | Lajoie et al. |
| 8,606,069 | B2 | 12/2013 | Okubo et al. |

(56)                  References Cited

U.S. PATENT DOCUMENTS

| | | |
|---|---|---|
| 8,649,669 B2 | 2/2014 | Braness et al. |
| 8,681,866 B1 | 3/2014 | Jia |
| 8,683,066 B2 | 3/2014 | Hurst et al. |
| 8,774,609 B2 | 7/2014 | Drake et al. |
| 8,782,268 B2 | 7/2014 | Pyle et al. |
| 8,806,188 B2 | 8/2014 | Braness et al. |
| 8,819,116 B1 | 8/2014 | Tomay et al. |
| 8,832,297 B2 | 9/2014 | Soroushian et al. |
| 8,843,586 B2 | 9/2014 | Pantos et al. |
| 8,849,950 B2 | 9/2014 | Stockhammer et al. |
| 8,909,922 B2 | 12/2014 | Kiefer et al. |
| 8,914,534 B2 | 12/2014 | Braness et al. |
| 8,918,908 B2 | 12/2014 | Ziskind et al. |
| 8,997,254 B2 | 3/2015 | Amidei et al. |
| 9,038,116 B1 | 5/2015 | Knox et al. |
| 9,197,685 B2 | 11/2015 | Soroushian |
| 10,075,292 B2 | 9/2018 | Amidei et al. |
| 10,721,285 B2 | 7/2020 | Braness et al. |
| 2001/0021276 A1 | 9/2001 | Zhou |
| 2001/0052077 A1 | 12/2001 | Fung et al. |
| 2001/0052127 A1 | 12/2001 | Seo et al. |
| 2002/0048450 A1 | 4/2002 | Zetts |
| 2002/0057898 A1 | 5/2002 | Normile |
| 2002/0067432 A1 | 6/2002 | Kondo et al. |
| 2002/0135607 A1 | 9/2002 | Kato et al. |
| 2002/0141503 A1 | 10/2002 | Kobayashi et al. |
| 2002/0154779 A1 | 10/2002 | Asano et al. |
| 2002/0164024 A1 | 11/2002 | Arakawa et al. |
| 2002/0169971 A1 | 11/2002 | Asano et al. |
| 2002/0191959 A1 | 12/2002 | Lin et al. |
| 2003/0002577 A1 | 1/2003 | Pinder |
| 2003/0002578 A1 | 1/2003 | Tsukagoshi et al. |
| 2003/0005139 A1 | 1/2003 | Colville et al. |
| 2003/0044080 A1 | 3/2003 | Frishman et al. |
| 2003/0053541 A1 | 3/2003 | Sun et al. |
| 2003/0063675 A1 | 4/2003 | Kang et al. |
| 2003/0065777 A1 | 4/2003 | Mattila et al. |
| 2003/0077071 A1 | 4/2003 | Lin et al. |
| 2003/0135742 A1 | 7/2003 | Evans |
| 2003/0142594 A1 | 7/2003 | Tsumagari et al. |
| 2003/0152370 A1 | 8/2003 | Otomo et al. |
| 2003/0163824 A1 | 8/2003 | Gordon et al. |
| 2003/0206717 A1 | 11/2003 | Yogeshwar et al. |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0001594 A1 | 1/2004 | Krishnaswamy et al. |
| 2004/0022391 A1 | 2/2004 | O'brien |
| 2004/0024688 A1 | 2/2004 | Bi et al. |
| 2004/0028227 A1 | 2/2004 | Yu |
| 2004/0037421 A1 | 2/2004 | Truman |
| 2004/0039916 A1 | 2/2004 | Aldis et al. |
| 2004/0047592 A1 | 3/2004 | Seo et al. |
| 2004/0047607 A1 | 3/2004 | Seo et al. |
| 2004/0076237 A1 | 4/2004 | Kadono et al. |
| 2004/0081333 A1 | 4/2004 | Grab et al. |
| 2004/0081434 A1 | 4/2004 | Jung et al. |
| 2004/0093494 A1 | 5/2004 | Nishimoto et al. |
| 2004/0101059 A1 | 5/2004 | Joch et al. |
| 2004/0107356 A1 | 6/2004 | Shamoon et al. |
| 2004/0136698 A1 | 7/2004 | Mock |
| 2004/0158878 A1 | 8/2004 | Ratnakar et al. |
| 2004/0268400 A1 | 12/2004 | Barde et al. |
| 2005/0013494 A1 | 1/2005 | Srinivasan et al. |
| 2005/0038826 A1 | 2/2005 | Bae et al. |
| 2005/0063541 A1 | 3/2005 | Candelore |
| 2005/0076232 A1 | 4/2005 | Kawaguchi |
| 2005/0114896 A1 | 5/2005 | Hug |
| 2005/0144468 A1 | 6/2005 | Northcutt |
| 2005/0149450 A1 | 7/2005 | Stefik et al. |
| 2005/0177741 A1 | 8/2005 | Chen et al. |
| 2005/0193070 A1 | 9/2005 | Brown et al. |
| 2005/0193322 A1 | 9/2005 | Lamkin et al. |
| 2005/0198681 A1 | 9/2005 | Park et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0243912 A1 | 11/2005 | Kwon et al. |
| 2005/0265555 A1 | 12/2005 | Pippuri |
| 2005/0273695 A1 | 12/2005 | Schnurr |
| 2005/0275656 A1 | 12/2005 | Corbin et al. |
| 2006/0002425 A1 | 1/2006 | Mane et al. |
| 2006/0013568 A1 | 1/2006 | Rodriguez |
| 2006/0031564 A1 | 2/2006 | Brassil et al. |
| 2006/0078301 A1 | 4/2006 | Ikeda et al. |
| 2006/0129909 A1 | 6/2006 | Butt et al. |
| 2006/0165163 A1 | 7/2006 | Burazerovic et al. |
| 2006/0173887 A1 | 8/2006 | Breitfeld et al. |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2007/0031110 A1 | 2/2007 | Rijckaert |
| 2007/0047645 A1 | 3/2007 | Takashima |
| 2007/0047901 A1 | 3/2007 | Ando et al. |
| 2007/0053513 A1 | 3/2007 | Hoffberg |
| 2007/0058928 A1 | 3/2007 | Naito et al. |
| 2007/0067472 A1 | 3/2007 | Maertens et al. |
| 2007/0083467 A1 | 4/2007 | Lindahl et al. |
| 2007/0083617 A1 | 4/2007 | Chakrabarti et al. |
| 2007/0086528 A1 | 4/2007 | Mauchly et al. |
| 2007/0100757 A1 | 5/2007 | Rhoads |
| 2007/0136817 A1 | 6/2007 | Nguyen |
| 2007/0140647 A1 | 6/2007 | Kusunoki et al. |
| 2007/0154165 A1 | 7/2007 | Hemmeryckz-Deleersnijder et al. |
| 2007/0168541 A1 | 7/2007 | Gupta et al. |
| 2007/0168542 A1 | 7/2007 | Gupta et al. |
| 2007/0180051 A1 | 8/2007 | Kelly et al. |
| 2007/0180125 A1 | 8/2007 | Knowles et al. |
| 2007/0185982 A1 | 8/2007 | Nakanowatari et al. |
| 2007/0239839 A1 | 10/2007 | Buday et al. |
| 2007/0274679 A1 | 11/2007 | Yahata et al. |
| 2007/0292107 A1 | 12/2007 | Yahata et al. |
| 2008/0043832 A1 | 2/2008 | Barkley et al. |
| 2008/0066181 A1 | 3/2008 | Haveson et al. |
| 2008/0086570 A1 | 4/2008 | Dey et al. |
| 2008/0101466 A1 | 5/2008 | Swenson et al. |
| 2008/0101718 A1 | 5/2008 | Yang et al. |
| 2008/0120389 A1 | 5/2008 | Bassali et al. |
| 2008/0126248 A1 | 5/2008 | Lee et al. |
| 2008/0137736 A1 | 6/2008 | Richardson et al. |
| 2008/0137847 A1 | 6/2008 | Candelore et al. |
| 2008/0172441 A1 | 7/2008 | Speicher et al. |
| 2008/0192818 A1 | 8/2008 | DiPietro et al. |
| 2008/0195744 A1 | 8/2008 | Bowra et al. |
| 2008/0205860 A1 | 8/2008 | Holtman |
| 2008/0222302 A1 | 9/2008 | Nguyen et al. |
| 2008/0256105 A1 | 10/2008 | Nogawa et al. |
| 2008/0263354 A1 | 10/2008 | Beuque et al. |
| 2008/0279535 A1 | 11/2008 | Haque et al. |
| 2008/0310454 A1 | 12/2008 | Bellwood et al. |
| 2008/0310496 A1 | 12/2008 | Fang |
| 2009/0010622 A1 | 1/2009 | Yahata et al. |
| 2009/0013195 A1 | 1/2009 | Ochi et al. |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0066839 A1 | 3/2009 | Jung et al. |
| 2009/0077143 A1 | 3/2009 | Macy, Jr. |
| 2009/0106082 A1 | 4/2009 | Senti et al. |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0136216 A1 | 5/2009 | Soroushian et al. |
| 2009/0150557 A1 | 6/2009 | Wormley et al. |
| 2009/0169181 A1 | 7/2009 | Priyadarshi et al. |
| 2009/0178090 A1 | 7/2009 | Oztaskent |
| 2009/0201988 A1 | 8/2009 | Gazier et al. |
| 2009/0226148 A1 | 9/2009 | Nesvadba et al. |
| 2009/0228395 A1 | 9/2009 | Wegner et al. |
| 2009/0249081 A1 | 10/2009 | Zayas |

(56) References Cited

U.S. PATENT DOCUMENTS

| | | |
|---|---|---|
| 2009/0282162 A1 | 11/2009 | Mehrotra et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310819 A1 | 12/2009 | Hatano |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0328124 A1 | 12/2009 | Khouzam et al. |
| 2010/0040351 A1 | 2/2010 | Toma et al. |
| 2010/0074324 A1 | 3/2010 | Qian et al. |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0111192 A1 | 5/2010 | Graves |
| 2010/0118978 A1 | 5/2010 | Rodriguez et al. |
| 2010/0138903 A1 | 6/2010 | Medvinsky |
| 2010/0142915 A1 | 6/2010 | Mcdermott et al. |
| 2010/0158109 A1 | 6/2010 | Dahlby et al. |
| 2010/0161825 A1 | 6/2010 | Ronca et al. |
| 2010/0186092 A1 | 7/2010 | Takechi et al. |
| 2010/0189183 A1 | 7/2010 | Gu et al. |
| 2010/0228795 A1 | 9/2010 | Hahn |
| 2010/0235472 A1 | 9/2010 | Sood et al. |
| 2010/0290761 A1 | 11/2010 | Drake et al. |
| 2010/0306373 A1 | 12/2010 | Wormley |
| 2010/0313225 A1 | 12/2010 | Cholas et al. |
| 2010/0313226 A1 | 12/2010 | Cholas et al. |
| 2010/0319014 A1 | 12/2010 | Lockett et al. |
| 2011/0010466 A1 | 1/2011 | Fan et al. |
| 2011/0047209 A1 | 2/2011 | Lindholm et al. |
| 2011/0058675 A1 | 3/2011 | Brueck et al. |
| 2011/0066673 A1 | 3/2011 | Outlaw |
| 2011/0078440 A1 | 3/2011 | Feng et al. |
| 2011/0080940 A1 | 4/2011 | Bocharov |
| 2011/0082924 A1 | 4/2011 | Gopalakrishnan |
| 2011/0096828 A1 | 4/2011 | Chen et al. |
| 2011/0103374 A1 | 5/2011 | Lajoie et al. |
| 2011/0107379 A1 | 5/2011 | Lajoie et al. |
| 2011/0126191 A1 | 5/2011 | Hughes et al. |
| 2011/0129011 A1 | 6/2011 | Cilli et al. |
| 2011/0135090 A1 | 6/2011 | Chan et al. |
| 2011/0142415 A1 | 6/2011 | Rhyu |
| 2011/0145726 A1 | 6/2011 | Wei et al. |
| 2011/0145858 A1 | 6/2011 | Philpott et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0173345 A1 | 7/2011 | Knox et al. |
| 2011/0179185 A1 | 7/2011 | Wang et al. |
| 2011/0191803 A1 | 8/2011 | Baldwin et al. |
| 2011/0197237 A1 | 8/2011 | Turner |
| 2011/0197261 A1 | 8/2011 | Dong et al. |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0246661 A1 | 10/2011 | Manzari et al. |
| 2011/0252118 A1 | 10/2011 | Pantos et al. |
| 2011/0264530 A1 | 10/2011 | Santangelo et al. |
| 2011/0268178 A1 | 11/2011 | Park et al. |
| 2011/0296048 A1 | 12/2011 | Knox et al. |
| 2011/0302319 A1 | 12/2011 | Ha et al. |
| 2011/0305273 A1 | 12/2011 | He et al. |
| 2011/0314130 A1 | 12/2011 | Strasman |
| 2011/0314176 A1 | 12/2011 | Frojdh et al. |
| 2011/0314500 A1 | 12/2011 | Gordon |
| 2012/0005312 A1 | 1/2012 | Mcgowan et al. |
| 2012/0023251 A1 | 1/2012 | Pyle et al. |
| 2012/0042090 A1 | 2/2012 | Chen et al. |
| 2012/0047542 A1 | 2/2012 | Lewis et al. |
| 2012/0093214 A1 | 4/2012 | Urbach |
| 2012/0110120 A1 | 5/2012 | Willig et al. |
| 2012/0167132 A1 | 6/2012 | Mathews et al. |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | Van Der Schaar |
| 2012/0179834 A1 | 7/2012 | Van Der Schaar et al. |
| 2012/0233345 A1 | 9/2012 | Hannuksela |
| 2012/0254455 A1 | 10/2012 | Adimatyam et al. |
| 2012/0265562 A1 | 10/2012 | Daouk et al. |
| 2012/0278496 A1 | 11/2012 | Hsu |
| 2012/0278497 A1 | 11/2012 | Hsu et al. |
| 2012/0294355 A1 | 11/2012 | Holcomb et al. |
| 2012/0297081 A1* | 11/2012 | Karlsson ........ H04N 21/440227 |
| | | 709/231 |
| 2012/0307883 A1 | 12/2012 | Graves |
| 2012/0311094 A1 | 12/2012 | Biderman et al. |
| 2012/0311174 A1 | 12/2012 | Bichot et al. |
| 2012/0314778 A1 | 12/2012 | Salustri et al. |
| 2012/0331167 A1 | 12/2012 | Hunt |
| 2013/0007200 A1 | 1/2013 | van der Schaar et al. |
| 2013/0013803 A1 | 1/2013 | Bichot et al. |
| 2013/0044821 A1 | 2/2013 | Braness et al. |
| 2013/0046902 A1 | 2/2013 | Villegas Nuñez et al. |
| 2013/0051554 A1 | 2/2013 | Braness et al. |
| 2013/0054958 A1 | 2/2013 | Braness et al. |
| 2013/0058480 A1 | 3/2013 | Ziskind et al. |
| 2013/0061040 A1 | 3/2013 | Kiefer et al. |
| 2013/0061045 A1 | 3/2013 | Kiefer et al. |
| 2013/0080267 A1 | 3/2013 | McGowan |
| 2013/0166765 A1 | 6/2013 | Kaufman |
| 2013/0166906 A1 | 6/2013 | Swaminathan et al. |
| 2013/0179199 A1 | 7/2013 | Ziskind et al. |
| 2013/0179992 A1 | 7/2013 | Ziskind et al. |
| 2013/0226578 A1 | 8/2013 | Bolton et al. |
| 2013/0226635 A1 | 8/2013 | Fisher |
| 2013/0311670 A1 | 11/2013 | Tarbox et al. |
| 2013/0329781 A1 | 12/2013 | Su et al. |
| 2014/0101722 A1 | 4/2014 | Moore |
| 2014/0140253 A1 | 5/2014 | Lohmar et al. |
| 2014/0149557 A1 | 5/2014 | Lohmar et al. |
| 2014/0189065 A1 | 7/2014 | van der Schaar et al. |
| 2014/0241420 A1 | 8/2014 | Orton-jay et al. |
| 2014/0241421 A1 | 8/2014 | Orton-Jay et al. |
| 2014/0250473 A1 | 9/2014 | Braness et al. |
| 2014/0307804 A1 | 10/2014 | Rodriguez et al. |
| 2015/0288530 A1 | 10/2015 | Oyman |
| 2017/0288865 A1 | 10/2017 | Amidei et al. |
| 2019/0044995 A1 | 2/2019 | Amidei |

FOREIGN PATENT DOCUMENTS

| | | |
|---|---|---|
| CN | 109154930 A | 1/2019 |
| EP | 813167 A2 | 12/1997 |
| EP | 1056273 A2 | 11/2000 |
| EP | 1453319 A1 | 9/2004 |
| EP | 1283640 B1 | 10/2006 |
| EP | 2180664 A1 | 4/2010 |
| EP | 2360923 A1 | 8/2011 |
| EP | 2735116 A2 | 5/2014 |
| EP | 3436964 A1 | 2/2019 |
| HK | 1259659 A | 12/2019 |
| JP | 2007215069 A | 8/2007 |
| JP | 2014529967 A | 11/2014 |
| JP | 2019513337 A | 5/2019 |
| JP | 7001673 B2 | 12/2021 |
| KR | 20040039852 A | 5/2004 |
| KR | 20060106250 A | 10/2006 |
| RU | 2328040 C2 | 6/2008 |
| SG | 11201808640 | 1/2021 |
| WO | 2000049762 A2 | 8/2000 |
| WO | 2000049763 A1 | 8/2000 |
| WO | 2003047262 A2 | 6/2003 |
| WO | 2004012378 A2 | 2/2004 |
| WO | 2004100158 A1 | 11/2004 |
| WO | 2004102571 A1 | 11/2004 |
| WO | 2005008385 A2 | 1/2005 |
| WO | 2005015935 A1 | 2/2005 |

(56) References Cited

FOREIGN PATENT DOCUMENTS

| WO | 2009006302 A1 | 1/2009 |
| WO | 2009065137 A1 | 5/2009 |
| WO | 2009109976 A2 | 9/2009 |
| WO | 2010060106 A1 | 5/2010 |
| WO | 2010122447 A1 | 10/2010 |
| WO | 2011087449 A1 | 7/2011 |
| WO | 2011101371 A1 | 8/2011 |
| WO | 2011103364 A1 | 8/2011 |
| WO | 2012094171 A1 | 7/2012 |
| WO | 20120094181 A2 | 7/2012 |
| WO | 20120094189 A1 | 7/2012 |
| WO | 2012177872 A2 | 12/2012 |
| WO | 2012177872 A3 | 12/2012 |
| WO | 2013103986 A2 | 7/2013 |
| WO | 2014003951 A2 | 1/2014 |
| WO | 2017172352 A1 | 10/2017 |

OTHER PUBLICATIONS

European Search Report for Application 11855103.5, search completed Jun. 26, 2014, 9 pgs.
European Search Report for Application 11855237.1, search completed Jun. 12, 2014, 9 pgs.
Extended European Search Report for European Application No. 17776285.3, Search completed Jan. 31, 2019, Mailed Feb. 12, 2019, 9 pgs.
Federal Computer Week, "Tool Speeds Info to Vehicles", Jul. 25, 1999, 5 pgs.
HTTP Live Streaming Overview, Networking & Internet, Apple, Inc., Apr. 1, 2011, 38 pgs.
Information Technology—MPEG Systems Technologies—Part 7: Common Encryption in ISO Base Media File Format Files (ISO/IEC 23001-7), Apr. 2015, 24 pgs.
InformationWeek, "Internet on Wheels", InformationWeek: Front End: Daily Dose, Jul. 20, 1999, Printed on Mar. 26, 2014, 3 pgs.
International Preliminary Report on Patentability for International Application PCT/US2013/043181, issued Dec. 31, 2014, Mailed Jan. 8, 2015, 11 pgs.
International Preliminary Report on Patentability for International Application PCT/US2017/022348, Report issued Oct. 2, 2018, Mailed Oct. 11, 2018, 9 pgs.
International Search Report and Written Opinion for International Application No. PCT/US2013/043181, completed Nov. 27, 2013, mailed Dec. 6, 2013, 12 pgs.
International Search Report and Written Opinion for International Application No. PCT/US2017/022348, completed May 4, 2017, Mailed Jun. 1, 2017, 15 pgs.
International Search Report and Written Opinion for International Application PCT/US2011/066927, completed Apr. 3, 2012, Mailed Apr. 20, 2012, 14 pgs.
International Search Report and Written Opinion for International Application PCT/US2011/067167, completed Jun. 19, 2012, Mailed Jul. 2, 2012, 11 pgs.
International Search Report and Written Opinion for PCT/US2013/020572, International Filing Date Jan. 7, 2013, Search Completed Mar. 19, 2013, Mailed Apr. 29, 2013, 10 pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media File Format, Oct. 2008, 120 pgs.
ISO/IEC FCD 23001-6 MPEG systems technologies Part 6: Dynamic adaptive streaming over http (dash), Jan. 28, 2011, 86 pgs.
ITS International, "Fleet System Opts for Mobile Server", Aug. 26, 1999, Printed on Oct. 21, 2011, from http://www.itsinternational.com/News/article.cfm?recordID=547, 2 pgs.
Microsoft Corporation, Advanced Systems Format (ASF) Specification, Revision Jan. 20, 2003, Dec. 2004, 121 pgs.

Microsoft Media Platform: Player Framework, "Microsoft Media Platform: Player Framework v2.5 (formerly Silverlight Media Framework)", May 3, 2011, 2 pgs.
Microsoft Media Platform: Player Framework, "Silverlight Media Framework v1.1", Jan. 2010, 2 pgs.
MPEG-DASH presentation at Streaming Media West 2011, Nov. 2011, 14 pgs.
Pomelo, LLC Tech Memo, Analysis of Netflix's Security Framework for 'Watch Instantly' Service, Mar.-Apr. 2009, 18 pgs.
Server-Side Stream Repackaging (Streaming Video Technologies Panorama, Part 2), Jul. 2011, 15 pgs.
Text of ISO/IEC 23001-6: Dynamic adaptive streaming over http (Dash), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
"Adaptive Streaming Comparison", Jan. 28, 2010, 5 pgs.
"Apple HTTP Live Streaming specification", Aug. 2017, 60 pgs.
"Best Practices for Multi-Device Transcoding", Kaltura Open Source Video, Printed on Nov. 27, 2013 from knowledge.kaltura.com/best-practices-multi-device-transcoding, 13 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.
"Delivering Live and On-Demand Smooth Streaming", Microsoft Silverlight, 2009, 28 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for...-a018239381, 6 pgs.
"Information Technology-Coding of Audio Visual Objects—Part 2: Visual", International Standard, ISO/IEC 14496-2, Third Edition, Jun. 1, 2004, pp. 1-724. (Presented in 3 Parts).
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"MPEG-2, Part 1, ISO/IEC 13818-1", Information technology—Generic Coding of Moving Pictures and Associated Audio: Systems, Nov. 13, 1994, 161 pgs.
"MPEG-4, Part 14, ISO/IEC 14496-14", Information technology—Coding of audio-visual objects, Nov. 15, 2003, 18 pgs.
"Netflix turns on subtitles for PC, Mac streaming", Yahoo! News, Apr. 21, 2010, Printed on Mar. 26, 2014, 3 pgs.
"OpenDML AVI File Format Extensions Version 1.02", OpenDML AVI MJPEG File Format Subcommittee. Last revision: Feb. 28, 1996. Reformatting: Sep. 1997, 42 pgs.
"Single-Encode Streaming for Multiple Screen Delivery", Telestream Wowza Media Systems, 2009, 6 pgs.
"Smooth Streaming Client", The Official Microsoft IIS Site, Sep. 24, 2010, 4 pgs.
"Supported Media Formats", Supported Media Formats, Android Developers, Printed on Nov. 27, 2013, from developer.android.com/guide/appendix/media-formats.html, 3 pgs.
"The MPEG-DASH Standard for Multimedia Streaming Over the Internet", IEEE MultiMedia, vol. 18, No. 4, 2011, 7 pgs.

(56)  References Cited

OTHER PUBLICATIONS

"Thread: SSME (Smooth Streaming Medial Element) config.xml review (Smooth Streaming Client configuration file)", Printed on Mar. 26, 2014, 3 pgs.

"Transcoding Best Practices", From movideo, Printed on Nov. 27, 2013 from code.movideo.com/Transcoding_Best_Practices, 5 pgs.

"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.

"Windows Media Player 9", Microsoft, Mar. 23, 2017, 3 pgs.

U.S. Appl. No. 13/224,298, "Final Office Action Received", May 19, 2014, 26 pgs.

Abomhara et al., "Enhancing Selective Encryption for H.264/AVC Using Advanced Encryption Standard", International Journal of computer Theory and Engineering, Apr. 2010, vol. 2, No. 2, pp. 223-229.

Akhshabi et al., "An Experimental Evaluation of Rate-Adaptation Algorithms in Adaptive Streaming over HTTP", MMSys'11, Feb. 23-25, 2011, 12 pgs.

Alattar et al., A.M. "Improved selective encryption techniques for secure transmission of MPEG video bit-streams", In Proceedings 1999 International Conference on Image Processing (Cat. 99CH36348), IEEE, vol. 4, 1999, pp. 256-260.

Anonymous, "Method for the encoding of a compressed video sequence derived from the same video sequence compressed at a different bit rate without loss of data", ip.com, ip.com No. IPCOM000008165D, May 22, 2002, pp. 1-9.

Antoniou et al., "Adaptive Methods for the Transmission of Video Streams in Wireless Networks", 2015, 50 pgs.

Apostolopoulos et al., "Secure Media Streaming and Secure Transcoding", Multimedia Security Technologies for Digital Rights Management, 2006, 33 pgs.

Asai et al., "Essential Factors for Full-Interactive VOD Server: Video File System, Disk Scheduling, Network", Proceedings of Globecom '95, Nov. 14-16, 1995, 6 pgs.

Author Unknown, "Tunneling QuickTime RTSP and RTP over HTTP", Published by Apple Computer, Inc.: 1999 (month unknown), 6 pgs.

Beker et al., "Cipher Systems, The Protection of Communications", 1982, 40 pgs.

Bocharov et al, "Portable Encoding of Audio-Video Objects, The Protected Interoperable File Format (PIFF)", Microsoft Corporation, First Edition Sep. 8, 2009, 30 pgs.

Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (Presented in 5 Parts).

Cahill et al., "Locally Adaptive Deblocking Filter for Low Bit Rate Video", Proceedings 2000 International Conference on Image Processing, Sep. 10-13, 2000, Vancouver, BC, Canada, 4 pgs.

Candelore, U.S. Appl. No. 60/372,901, filed Apr. 17, 2002.

Chaddha et al., "A Frame-work for Live Multicast of Video Streams over the Internet", Proceedings of 3rd IEEE International Conference on Image Processing, Sep. 19, 1996, Lausanne, Switzerland, 4 pgs.

Cheng, "Partial Encryption for Image and Video Communication", Thesis, Fall 1998, 95 pgs.

Cheng et al., "Partial encryption of compressed images and videos", IEEE Transactions on Signal Processing, vol. 48, No. 8, Aug. 2000, 33 pgs.

Cheung et al., "On the Use of Destination Set Grouping to Improve Fairness in Multicast Video Distribution", Proceedings of IEEE INFOCOM'96, Conference on Computer Communications, IEEE, vol. 2, 1996, 23 pgs.

Collet, "Delivering Protected Content, An Approach for Next Generation Mobile Technologies", Thesis, 2010, 84 pgs.

Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.

Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.

Dworkin, "Recommendation for Block Cipher Modes of Operation: Methods and Techniques", NIST Special Publication 800-38A, 2001, 66 pgs.

Fang et al., "Real-time deblocking filter for MPEG-4 systems", Asia-Pacific Conference on Circuits and Systems, Oct. 28-31, 2002, Bail, Indonesia, pp. 541-544.

Fecheyr-Lippens, "A Review of HTTP Live Streaming", Jan. 2010, 38 pgs.

Fielding et al., "Hypertext Transfer Protocol—HTTP1.1", Network Working Group, RFC 2616, Jun. 1999, 114 pgs.

Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, pp. 969-972.

Gannes, "The Lowdown on Apple's HTTP Adaptive Bitrate Streaming", GigaOM, Jun. 10, 2009, 12 pgs.

Ghosh, "Enhancing Silverlight Video Experiences with Contextual Data", Retrieved from: http://msdn.microsoft.com/en-us/magazine/ee336025.aspx, 2010,15 pgs.

Huang, U.S. Pat. No. 7,729,426, U.S. Appl. No. 11/230,794, filed Sep. 20, 2005.

Huang et al., "Adaptive MLP post-processing for block-based coded images", IEEE Proceedings—Vision, Image and Signal Processing, vol. 147, No. 5, Oct. 2000, pp. 463-473.

Huang et al., "Architecture Design for Deblocking Filter in H.264/JVT/AVC", 2003 International Conference on Multimedia and Expo., Jul. 6-9, 2003, Baltimore, MD, 4 pgs.

Inlet Technologies, "Adaptive Delivery to iDevices", 2010, 2 pgs.

Inlet Technologies, "Adaptive delivery to iPhone 3.0", 2009, 2 pgs.

Inlet Technologies, "HTTP versus RTMP", 2009, 3 pgs.

Inlet Technologies, "The World's First Live Smooth Streaming Event: The French Open", 2009, 2 pgs.

Jain et al., U.S. Appl. No. 61/522,623, filed Aug. 11, 2011.

Jung et al., "Design and Implementation of an Enhanced Personal Video Recorder for DTV", IEEE Transactions on Consumer Electronics, vol. 47, No. 4, Nov. 2001, 6 pgs.

Kalva, Hari "Delivering MPEG-4 Based Audio-Visual Services", 2001, 113 pgs.

Kang et al., "Access Emulation and Buffering Techniques for Steaming of Non-Stream Format Video Files", IEEE Transactions on Consumer Electronics, vol. 43, No. 3, Aug. 2001, 7 pgs.

Kim, Kyuheon "MPEG-2 ES/PES/TS/PSI", Kyung-Hee University, Oct. 4, 2010, 66 pages.

Kim et al, "A Deblocking Filter with Two Separate Modes in Block-Based Video Coding", IEEE transactions on circuits and systems for video technology, vol. 9, No. 1, 1999, pp. 156-160.

Kim et al., "Tree-Based Group Key Agreement", Feb. 2004, 37 pgs.

Kurzke et al., "Get Your Content Onto Google TV", Google, Retrieved from: http://commondatastorage.googleapis.com/io2012/presentations/live%20to%20website/1300.pdf, 2012, 58 pgs.

Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.

Laukens, "Adaptive Streaming—A Brief Tutorial", EBU Technical Review, 2011, 6 pgs.

Legault et al., "Professional Video Under 32-bit Windows Operating Systems", SMPTE Journal, vol. 105, No. 12, Dec. 1996, 10 pgs.

Levkov, "Mobile Encoding Guidelines for Android Powered Devices", Adobe Systems Inc., Addendum B, Dec. 22, 2010, 42 pgs.

Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.

(56)        References Cited

OTHER PUBLICATIONS

List et al., "Adaptive deblocking filter", IEEE transactions on circuits and systems for video technology, vol. 13, No. 7, Jul. 2003, pp. 614-619.

Massoudi et al., "Overview on Selective Encryption of Image and Video: Challenges and Perspectives", EURASIP Journal on Information Security, Nov. 2008, 18 pgs.

Mccanne et al., "Receiver-driven Layered Multicast", Conference proceedings on Applications, technologies, architectures, and protocols for computer communications, Aug. 1996, 14 pgs.

Meier, "Reduction of Blocking Artifacts in Image and Video Coding", IEEE Transactions on Circuits and Systems for Video Technology, vol. 9, No. 3, Apr. 1999, pp. 490-500.

MSDN, "Adaptive streaming, Expression Studio 2.0", Apr. 23, 2009, 2 pgs.

Nelson, "Smooth Streaming Deployment Guide", Microsoft Expression Encoder, Aug. 2010, 66 pgs.

Nelson, Michael "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pgs.

Newton et al., "Preserving Privacy by De-identifying Facial Images", Carnegie Mellon University School of Computer Science, Technical Report, CMU-CS-03-119, Mar. 2003, 26 pgs.

Noe, "Matroska File Format (Under Construction!)", Internet Citation, Jun. 24, 2007, XP002617671, Retrieved from the Internet: URL: http://web.archive.org/web/20070821155146/www.matroska.org/technical/specs/matroska.pdf [retrieved on Jan. 19, 2011], 51 pgs.

O'Brien, U.S. Appl. No. 60/399,846, filed Jul. 30, 2002.

Ooyala, "Widevine Content Protection", Ooyala Support Center for Developers. Ooyala, Inc., 2013. Jun. 3, 2013, http://support.ooyala.com/developers/documentation/concepts/player_v3_widevine_integration.html, 7 pgs.

O'Rourke, "Improved Image Decompression for Reduced Transform Coding Artifacts", IEEE Transactions on Circuits and Systems for Video Technology, vol. 5, No. 6, Dec. 1995, pp. 490-499.

Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.

Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.

Pantos, R "HTTP Live Streaming: draft-pantos-http-live-streaming-06", Published by the Internet Engineering Task Force (IETF), Mar. 31, 2011, 24 pgs.

Park et al., "A postprocessing method for reducing quantization effects in low bit-rate moving picture coding", IEEE Transactions on Circuits and Systems for Video Technology, vol. 9, No. 1, Feb. 1999, pp. 161-171.

RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.

Richardson, "H.264 and MPEG-4 Video Compression", Wiley, 2003, 306 pgs. (Presented in 2 Parts).

Schulzrinne, H "Real Time Streaming Protocol 2.0 (RTSP): draft-ietfmmusic-rfc2326bis-27", MMUSIC Working Group of the Internet Engineering Task Force (IETF), 296 pgs. (Presented in 2 Parts), Mar. 9, 2011, 296 pgs.

Schulzrinne et al., "Real Time Streaming Protocol (RTSP)", Internet Engineering Task Force, RFC 2326, Apr. 1998, 80 pgs.

Siglin, "HTTP Streaming: What You Need to Know", streamingmedia.com, 2010, 15 pgs.

Siglin, "Unifying Global Video Strategies, MP4 File Fragmentation for Broadcast, Mobile and Web Delivery", Nov. 16, 2011, 16 pgs.

Sima et al., "An Efficient Architecture for Adaptive Deblocking Filter of H.264 AVC Video Coding", IEEE Transactions on Consumer Electronics, vol. 50, No. 1, Feb. 2004, pp. 292-296.

Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.

Srinivasan et al., "Windows Media Video 9: overview and applications", Signal Processing: Image Communication, 2004, 25 pgs.

Stockhammer, "Dynamic Adaptive Streaming over HTTP—Standards and Design Principles", Proceedings of the second annual ACM conference on Multimedia, Feb. 2011, pp. 133-143.

Timmerer et al., "HTTP Streaming of MPEG Media", Proceedings of Streaming Day, 2010, 4 pgs.

Tiphaigne et al., "A Video Package for Torch", Jun. 2004, 46 pgs.

Trappe et al., "Key Management and Distribution for Secure Multimedia Multicast", IEEE Transaction on Multimedia, vol. 5, No. 4, Dec. 2003, pp. 544-557.

Van Deursen et al., "On Media Delivery Protocols in the Web", 2010 IEEE International Conference on Multimedia and Expo, Jul. 19-23, 2010, 6 pgs.

Ventura, Guillermo Albaida "Streaming of Multimedia Learning Objects", AG Integrated Communication System, Mar. 2003, 101 pgs.

Waggoner, "Compression for Great Digital Video", 2002, 184 pgs.

Watanabem et al., "MPEG-2 decoder enables DTV trick plays", esearcher System LSI Development Lab, Fujitsu Laboratories Ltd., Kawasaki, Japan, Jun. 2001, 2 pgs.

Wiegand, "Joint Video Team (JVT) of ISO/IEC MPEG and ITU-T VCEG", Jan. 2002, 70 pgs.

Willig et al., U.S. Appl. No. 61/409,285, filed Nov. 2, 2010.

Wu, Feng et al., "Next Generation Mobile Multimedia Communications: Media Codec and Media Transport Perspectives", In China Communications, Oct. 2006, pp. 30-44.

Yang et al., "Projection-Based Spatially Adaptive Reconstruction of Block-Transform Compressed Images", IEEE Transactions on Image Processing, vol. 4, No. 7, Jul. 1995, pp. 896-908.

Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.

Yu et al., "Video deblocking with fine-grained scalable complexity for embedded mobile computing", Proceedings 7th International Conference on Signal Processing, Aug. 31-Sep. 4, 2004, pp. 1173-1178.

Zakhor, "Iterative Procedures for Reduction of Blocking Effects in Transform Image Coding", IEEE Transactions on Circuits and Systems for Video Technology, vol. 2, No. 1, Mar. 1992, pp. 91-95.

Zambelli, "IIS Smooth Streaming Technical Overview", Microsoft Corporation, Mar. 31, 2009, XP055009366, Retrieved from the Internet: URL:http://img.prodek.It/documents/IIS_Smooth_Streaming_Technical_Overview.pdf, 17 pgs.

* cited by examiner

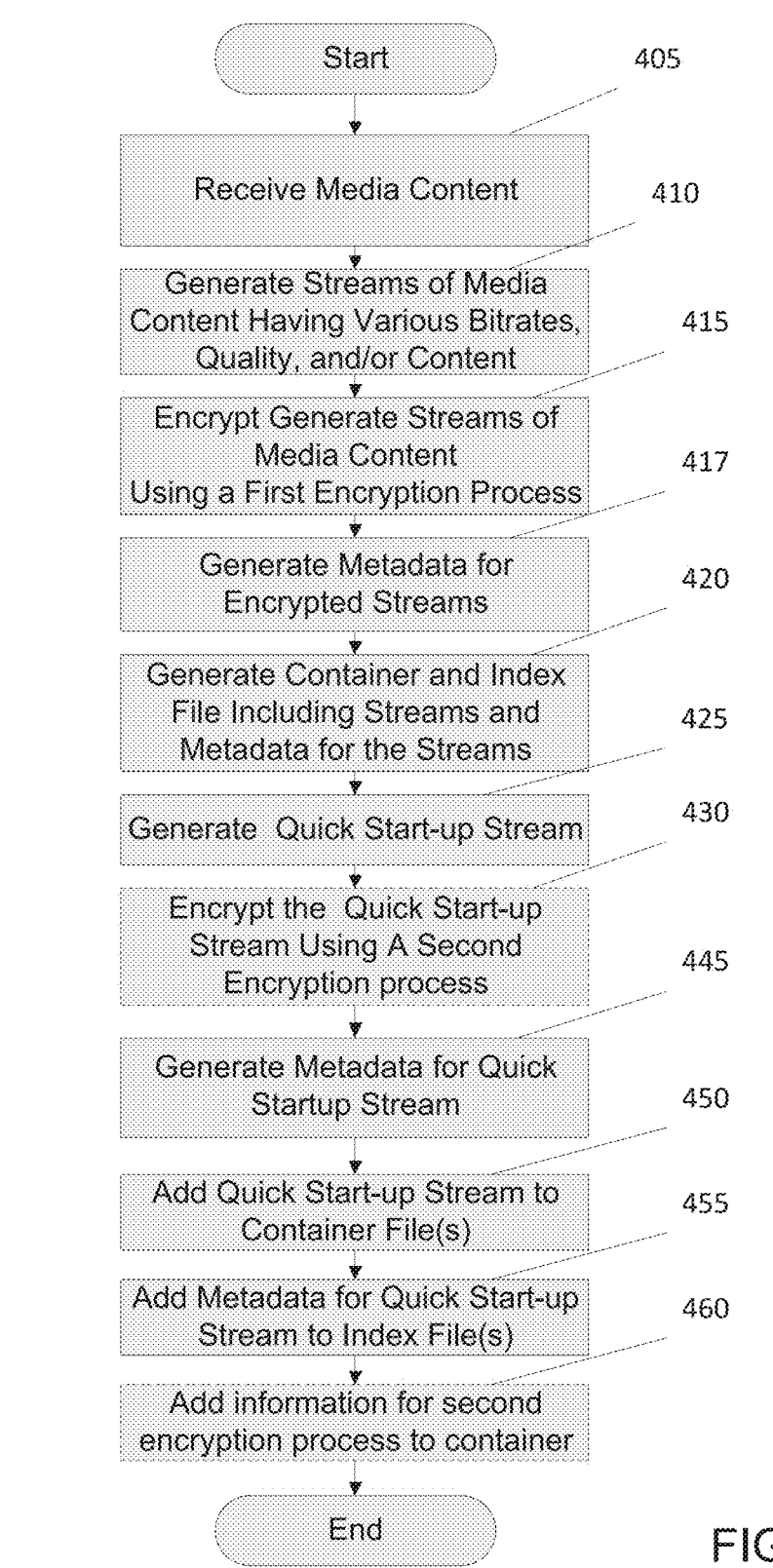

400

Start                                                    405

Receive Media Content                                    410

Generate Streams of Media
Content Having Various Bitrates,                          415
Quality, and/or Content Encrypt Generate Streams of
Media Content                                            417
Using a First Encryption Process Generate Metadata for
Encrypted Streams                                        420

Generate Container and Index
File Including Streams and                                425
Metadata for the Streams Generate  Quick Start-up Stream                          430

Encrypt the  Quick Start-up
Stream Using A Second                                    445
Encryption process Generate Metadata for Quick
Startup Stream                                           450

Add Quick Start-up Stream to                             455
Container File(s)

Add Metadata for Quick Start-up                          460
Stream to Index File(s)

Add information for second
encryption process to container

End

FIG. 4

SYSTEMS AND METHODS FOR QUICK START-UP OF PLAYBACK

CROSS-REFERENCE TO RELATED APPLICATIONS

The current application is a continuation of U.S. patent application Ser. No. 18/068,395 filed Dec. 19, 2022 and issued on Jul. 16, 2024 as U.S. Pat. No. 12,041,113, entitled "Systems and Methods for Quick Start-Up of Playback," which is a continuation of U.S. patent application Ser. No. 16/932,559 filed Jul. 17, 2020 and issued on Dec. 27, 2022 as U.S. patent application Ser. No. 11,539,780, entitled "Systems and Methods for Quick Start-Up of Playback", which is a continuation of U.S. patent application Ser. No. 16/101,339 filed Aug. 10, 2018 and issued on Jul. 21, 2020 as U.S. Pat. No. 10,721,285, entitled "Systems and Methods for Quick Start-Up of Playback", which is a continuation of U.S. patent application Ser. No. 15/085,598 filed Mar. 30, 2016 and issued on Sep. 11, 2018 as U.S. Pat. No. 10,075, 292, entitled "Systems and Methods for Quick Start-Up of Playback", the disclosures of which are incorporated by reference herein in their entireties for all purposes.

FIELD OF THE INVENTION

The present invention generally relates to adaptive streaming and more specifically to streaming systems that include a quick start-up stream for use in beginning playback of media content.

BACKGROUND

The term streaming media describes the playback of media on a playback device, where the media is stored on one or more servers and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Washington, and Flash Dynamic Streaming developed by Adobe Systems Incorporated of San Jose, California. HTTP Adaptive Bitrate Streaming developed by Apple Computer Incorporated of Cupertino, California implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by Divx, LLC of San Diego, California utilizes an extension of the Matroska container format (i.e. is based upon the Matroska container format, but includes elements that are not specified within the Matroska format).

To provide a consistent means for the delivery of media content over the Internet, the International Organization for Standardization (ISO) and the International Electrotechnical Commission (IEC) have put for the Dynamic Adaptive Streaming over HTTP (DASH) standard. The DASH standard specifies formats for the media content and the description of the content for delivery of MPEG content using HTTP. In accordance with DASH, each component of media content for a presentation is stored in one or more streams. Each of the streams is divided into segments. A Media Presentation Description (MPD) is a data structure that includes information about the segments in each of the stream and other information needed to present the media content during playback. A playback device uses the MPD to obtain the components of the media content using adaptive bit rate streaming for playback.

Often, content providers encrypt the data in the streams of media content to protect against unauthorized users accessing and using the media content. Thus, prior to playback, a playback device has to interact with an authentication system to obtain a key that may be used to decrypt the data from the streams. This process of obtaining the key often involves a negotiation process that takes time to complete. As such, the playback device cannot decrypt and playback the media content from a stream until the key is obtained by completing the negotiation process. In some cases, this may delay playback for an unacceptable amount of time.

SUMMARY OF THE INVENTION

Systems and methods for quick start-up of video playback in accordance with embodiments of the invention are disclosed. A process for providing a quick start-up of video playback in accordance with at least some embodiments of the invention is performed in the following manner. A playback device receives information for various of alternative streams of the media content and a quick start-up stream of media content from a content provider system over a network. The media content in the alternative streams is encoded at various bitrates, resolutions, and frame rates and the content in each particular alternative stream has a particular quality based upon at least one of the bitrate, resolution, and frame rate of the particular stream. The quality of media content in the quick start-up stream has a lesser quality than the video content of each of the alternative streams. The playback device commences streaming of the media content in the quick start-up stream from the content provider system over the network. The playback devices determines when a metric has been met by the streaming. In response to the metric being met, the playback device commences streaming of the media content from one of the alternative streams from the content provider system over the network.

In accordance with some embodiments, the alternative streams are encrypted using a first encryption process. In accordance with some of these embodiments the playback device requests a decryption key for the first encryption process from an authentication system over the network in response to receiving the information for the alternative streams. The playback device receives the decryption key for the first encryption process from the authentication system in response to requesting the decryption key and determines that the metric has been met in response to the playback device receiving the decryption key. In accordance with a number of embodiments, the quick start-up stream is encrypted using a second encryption process that is less secure than the first encryption process and the playback device obtains a decryption key for the second encryption process in response to receiving the information for the quick start-up stream using the playback device. The playback device then decodes the media content from the quick start-up stream with the second decryption key in response to receiving the media content in the quick start-up stream. In accordance with a number of embodiments, the second decryption key is read from the information received for the quick start-up stream by the playback device.

In accordance with many embodiments, the playback device obtains the second decryption in the following manner. The playback device reads decryption information for the second encryption process from the information received for the quick start-up key and requests the decryption key from the second encryption process from a content provider system over the network. The decryption key for the second decryption process is then received from the content provider system by the playback device.

In accordance with some embodiments, the playback device determines that the metric is met by determining either that at least one of a specified amount of video content is received using the quick start-up stream or a certain amount of time has elapsed.

In accordance with some embodiments, the playback device determines a specific portion of the media content is a start position for playback of the media content using the playback device and commences streaming the media content from the determined specific portion in the quick start-up stream.

BRIEF DESCRIPTION OF THE DRAWINGS

FIG. 4 illustrates a flow diagram of a process performed by an encoding system to encode streams including encrypted data of the media content in accordance with embodiments of the invention.

DETAILED DESCRIPTION

Figure 1:
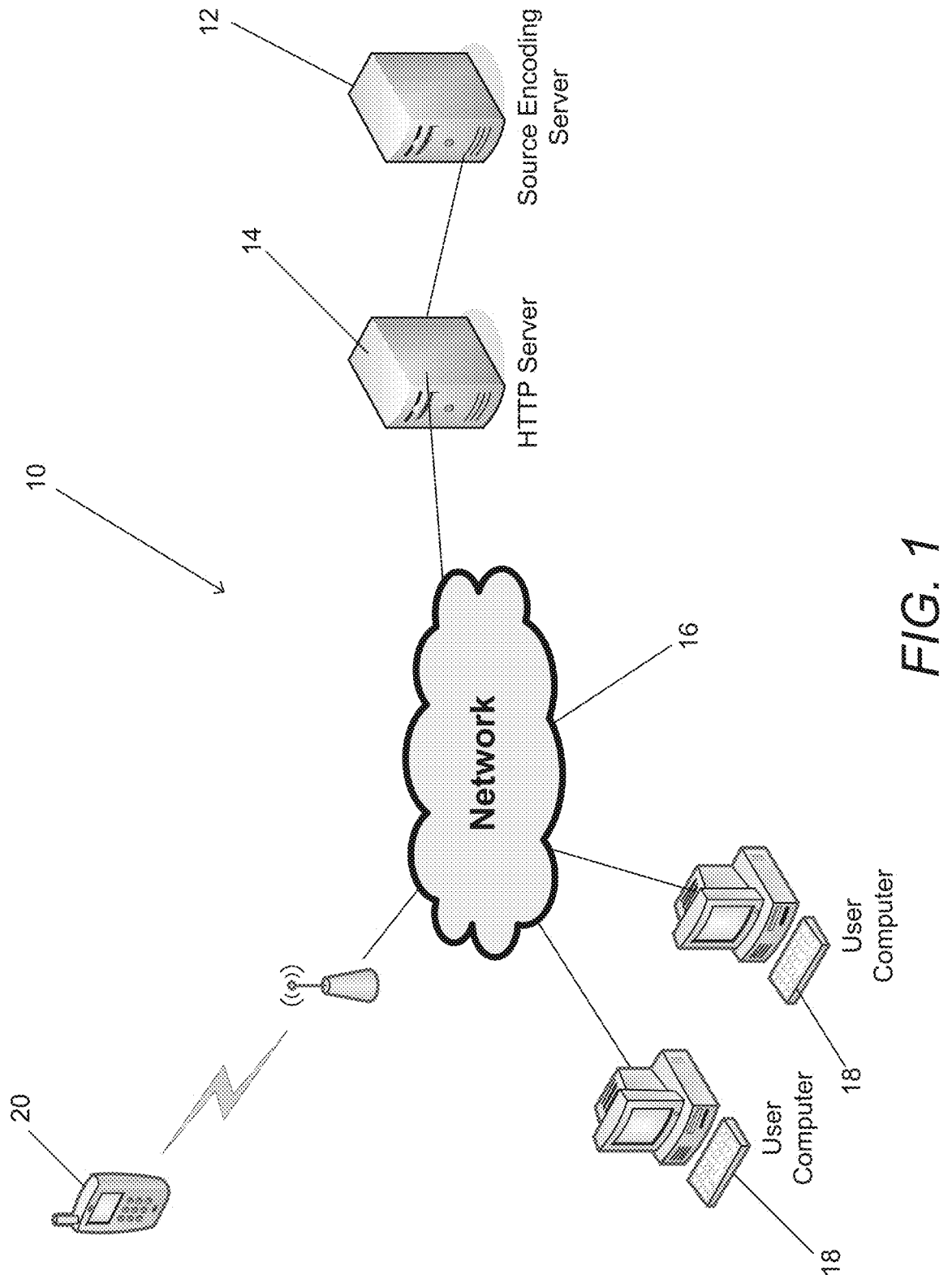
FIG. 1 illustrates a network diagram of an adaptive bitrate streaming system in accordance with an embodiment of the invention.

Turning now to the drawings, systems and methods for quick start-up of the playback of media content in an adaptive bitrate streaming system in accordance with some embodiments of the invention are illustrated. Start-up occurs when the next frame to be played back is not already stored within the buffer of the playback device. Start-up can occur, when a video is started for the first time or when playback is resumed after a non-sequential playback operation is performed, such as a chapter seek or time seek. Thus, a delay in buffering or loading of new media content (to reduce the likelihood of buffer underflow when playback commences) may result in a delay in displaying the new media content. In accordance with some embodiments, start-up is delayed when the encoded media content in the streams is encrypted and the playback device must first negotiate for and receive a decryption key to decode the media content. The delay in the start-up may be on the order of several seconds which is unsatisfactory to a user. To reduce the time needed for start-up, source media is encoded as at least one video stream for normal playback and at least one stream that can be utilized to perform quick start-up for playback of the encoded media in some embodiments of this invention. In order to further reduce the start-up time in some other embodiments, the source media is encoded as a number of alternative streams for adaptive bitrate streaming and at least one additional quick start-up stream. In the quick start-up stream, the source media is encoded in such a way that playback of encoded media from the quick start-up starts faster than playback of the encoded media from the conventional alternative streams. To do so, the quick start-up stream includes a lower quality version of the encoded media in accordance some embodiments. For purposes of this discussion, lower quality means that the encoded media has a lower resolution, bitrate, and/or frame rate than encoded media in another stream. In some other embodiments, the quick start-up stream may include a lower quality version of the encoded media that is encrypted in a different manner than the other alternative streams such that the time to obtain decryption information for the quick start-up stream is less than that of the encryption method used for the other alternative streams. In accordance with a number of these embodiments, the quick start-up stream may not be encrypted in any way. In accordance with some others of these embodiments, the quick start-up stream is encrypted using an encryption process that has a decryption key stored in the playback device and is accessible to the application performing the playback to allow decryption of the media content to commence immediately after the content is received from the quick start-up stream. The quick start-up stream can be utilized to fill the buffer of the playback device with the media content more quickly than the use of one of the conventional alternative stream to allow quicker start-up of playback. In several embodiments, the process of loading the quick start-up stream can involve instantiating a first decoder to decode the start-up stream and tearing down the first decoder and instantiating a second decoder to decode a higher resolution and/or more robustly encrypted stream that is buffered during playback of content by the first decoder.

In accordance with some embodiments, the media content is stored in streams in accordance with the DASH standards. However, one skilled in the art will recognize that the formats such as but not limited to, a Matroska (MKV) container file format may used to store streams of the media content without departing from this invention.

The performance of an adaptive bitrate streaming system in accordance with some embodiments of the invention can be significantly enhanced by encoding each portion of the source video in each of the alternative streams and the quick start-up stream at each bit rate in such a way that the portion of video is encoded in each stream as a single (or at least one) closed group of pictures (GOP) starting with an Instantaneous Decoder Refresh (IDR) frame, which is an intra frame. In many embodiments, the media content in the quick start-up stream is also encoded at a lower bitrate, frame rate and/or resolution than the video content in the other alternative streams to have a lower quality than the media content encoded in the other alternative streams. The playback device can switch between the alternative streams used during normal playback and the quick start-up stream at the completion of the playback of a segment and, irrespective of the stream from which a segment is obtained, the first frame in the segment will be an IDR frame that can be decoded without reference to any encoded media other than the encoded media contained within the Cluster element. Thus, a playback device may switch from receiving media content from the quick start-up stream and perform conventional adaptive bitrate streaming as if the quick start-up stream was any other available stream.

In a number of embodiments, the MPD may contain a decryption key that can be used to decrypt encoded media content in the quick start-up stream or a URL where the decryption key may be obtained. The playback device obtains information concerning each of the available streams from the MPD and selects one or more streams to utilize in the playback of the media. The playback device can then obtain header information from the container files containing the one or more bitstreams or streams, and the headers provide information concerning the decoding of the streams. The playback device can also request index information that indexes segments of the encoded media stored within the relevant container files. The index information can be stored within the container files or separately from the container files in the MPD or in separate index files. The index information enables the playback device to request byte ranges corresponding to segments of the media within the container file containing specific portions of encoded media via HTTP from the server. The playback device uses the index information to request portions of the media content from the quick start-up stream during start-up and then to request portions of the encoded media from the other alternative streams after start-up has completed in accordance with some embodiments. Playback is continued with the playback device requesting portions of the encoded content from a stream having media content that is encoded at a bitrate that can supported by the network conditions.

The encoding of source video for use in adaptive bitrate streaming systems that provide a quick start-up stream and the playback of the encoded media content using adaptive bit rate streaming in accordance with some embodiments of the invention is discussed further below.

Adaptive Streaming System Architecture

Turning now to the FIG. 1, an adaptive streaming system in accordance with an embodiment of the invention is illustrated. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). Typically, the source encoding server 12 generates a top level index to a plurality of container files containing the streams, at least a plurality of which are alternative streams. Alternative streams are streams that encode the same media content in different ways. In many instances, alternative streams encode media content (such as but not limited to video) at different maximum bitrates. In a number of embodiments, the alternative streams are encoded with different resolutions and/or at different frame rates. The top level index file and the container files are uploaded to an HTTP server 14. A variety of playback devices can then use HTTP or another appropriate stateless protocol to request portions of the top level index file and the container files via a network 16 such as the Internet.

In the illustrated embodiment, playback devices include personal computers 18, CE players, and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. Although a specific architecture is shown in FIG. 1, any of a variety of architectures including systems that perform conventional streaming and not adaptive bitrate streaming can be utilized that enable playback devices to request portions of the top level index file and the container files in accordance with embodiments of the invention.

Playback Device

Figure 2:
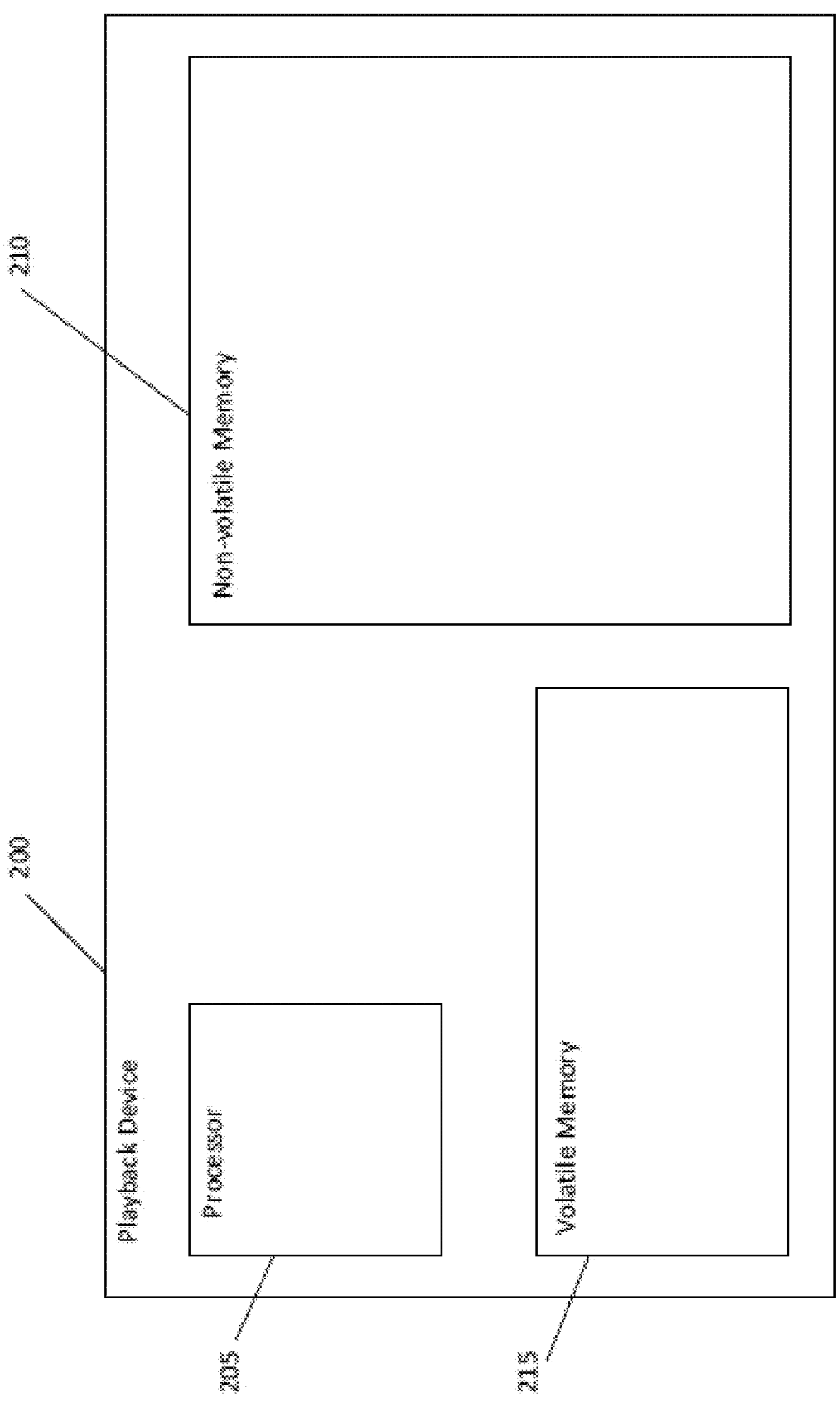
FIG. 2 illustrates a block diagram of components of a processing system such as a processing system in a playback device in accordance with an embodiment of the invention.

Some processes for providing methods and systems in accordance with embodiments of this invention are executed by a playback device. The relevant components in a playback device that can perform processes including adaptive streaming processes in accordance with embodiments of the invention are shown in FIG. 2. One skilled in the art will recognize that playback device may include other components that are omitted for brevity without departing from described embodiments of this invention. The playback device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or non-volatile memory 210 to manipulate data stored in the memory. The non-volatile memory 210 can store the processor instructions utilized to configure the playback device 200 to perform processes including processes in accordance with embodiments of the invention and/or data for the processes being utilized. In other embodiments, the playback device software and/or firmware can be stored in any of a variety of non-transitory computer readable media appropriate to a specific application.

Servers

Figure 3:
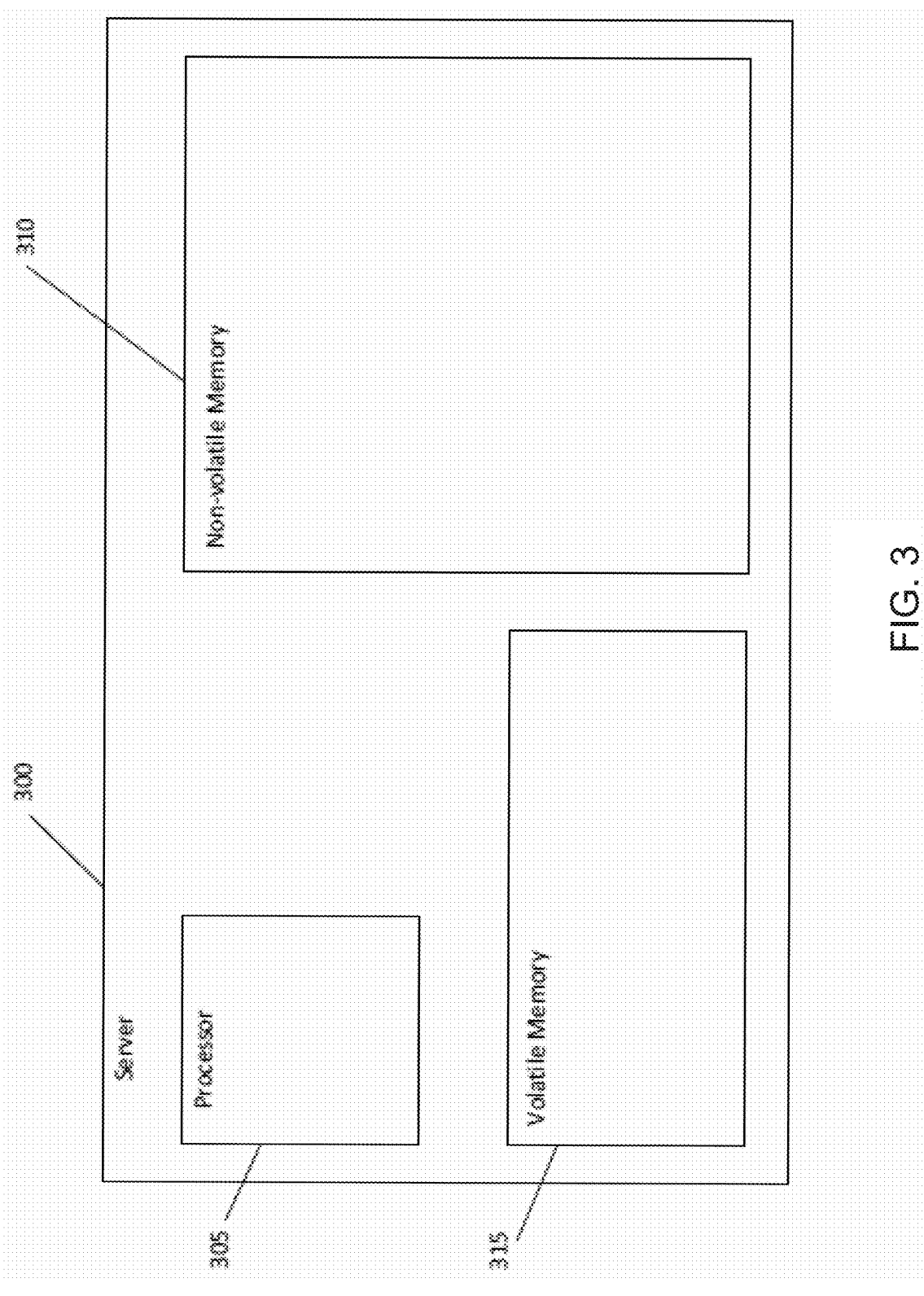
FIG. 3 illustrates a block diagram of components of a processing system such as a processing system in an encoding system, and/or a content provider system in accordance with an embodiment of the invention

Some processes for providing methods and systems in accordance with embodiments of this invention are executed by the HTTP server; source encoding server; and/or local and network time servers. The relevant components in a server that perform the processes in accordance with embodiments of the invention are shown in FIG. 3. One skilled in the art will recognize that a server may include other components that are omitted for brevity without departing from the described embodiments of this invention. The server 300 includes a processor 305, a non-volatile memory 310, and a volatile memory 315. The processor 305 is a processor, microprocessor, controller, or a combination of processors, microprocessor, and/or controllers that performs instructions stored in the volatile 315 or non-volatile memory 310 to manipulate data stored in the memory. The non-volatile memory 310 can store the processor instructions utilized to configure the server 300 to perform processes including processes in accordance with embodiments of the invention and/or data for the processes being utilized. In other embodiments, the server software and/or firmware can be stored in any of a variety of non-transitory computer readable media appropriate to a specific application. Although a specific server is illustrated in FIG. 3, any of a variety of servers configured to perform any number of processes can be utilized in accordance with embodiments of the invention.

Encoding of Quick Start-Up Stream and Alternative Streams

A flow diagram of a process for encoding source media content into alternative streams including a quick start-up stream performed by an encoding system in accordance with an embodiment of the invention is shown in FIG. 4. Process 400 includes receiving source media content (405). In accordance with some embodiments, the source media content may include a source media content having a particular resolution, frame rate, and other conventional properties. In accordance with other embodiments, the source media content may include multiple copies of a particular source media content where each copy of the source media content in a set of copies has a different resolution, frame rate and/or other properties to allow the generation of streams that have different properties for use by playback devices that support different media content characteristics.

The encoding system encodes the media content into alternative streams of content (410). In accordance with various embodiments, the alternative streams include one or more streams of the encoded video content. In accordance with some embodiments, the generated alternative streams have varying bitrates, level of quality, and/or content. For example, each alternative stream may have a different bit rate such that each stream can be used when network conditions can support the stream, such as (but not limited to) when network bandwidth exceeds a required bit rate for the stream. Furthermore, different alternative streams may include media content having different aspect ratios, resolutions, and/or frame rates to support different types of playback devices and/or the different bitrates of the streams in accordance with many embodiments.

The generated media content of the streams is encrypted using a first encryption process (415). The encryption of the stream prevents unauthorized users from viewing the media content. In accordance with some embodiments, the first encryption process uses a first key that is more secure than the key used to encrypt the quick start-up stream as discussed further below. One skilled in the art will recognize that any encryption method may be used without departing from the invention. A particular encryption process used in accordance with a number of embodiments of this invention is described in U.S. Pat. No. 8,909,922 entitled "Systems and methods for playing back alternative streams of protected content protected using common cryptographic information" issued to Kiefer et al. on Dec. 9, 2014 the portions relating to the adaptive bit rate streaming of encrypted material is hereby incorporated by reference.

Metadata for each of the alternative streams that includes the information discussed above with reference to container files is generated (417). In accordance with some embodiments, the metadata may include the information relating to properties of the stream included the encoded maximum bitrate of the stream and presentation time information of each chunk; properties of the media content including, but not limited to, resolution, frame rate, and sample aspect ratio. The container file(s) and index file(s) for the alternative streams is generated from the encrypted alternative streams and metadata for the encrypted streams. In accordance with some embodiments, the index files may include a top level index file that includes metadata for each stream and a pointer or URL for each of the alternative streams for use in adaptive bitrate streaming.

One skilled in the art will recognize that although the generating of the streams (410), encrypting of the streams (415), generating of metadata (417), and generation of the container file(s) (420) are shown as separate processes, the processes may be done simultaneously or in different sequences in accordance with some embodiments.

In addition, a quick start-up stream of the media content is generated (425). In accordance with some embodiments, the quick start-up stream includes a low quality version of the media content. In accordance with many of the embodiments, the low quality stream may include only a small portion of the media content, such as the beginning portion of the media content. For example, the quick start-up streams may include only a portion on the order of several seconds to minutes of the beginning portion of the media content to only allow the quick start-up and the beginning of the streaming. Optionally, the encoding system may encrypt the quick start-up data using a second encryption process (430). In accordance with a number of embodiments, the second encryption process is less secure than the first encryption process used for the other alternative streams. For example, the second encryption process may use a simple encryption/decryption key that may be less complex than the encryption/decryption key used in the first encryption process. The metadata for the quick start-up steam is generated (445). In accordance with some other embodiments, the encryption/decryption keys for the second encoding process is stored in the playback device and is available to the application playback the media. In accordance with many embodiments, the metadata generated for the quick start-up streams is the same as or similar to the metadata generated for the alternative streams as described above.

The encoding system then adds the quick start-up stream to a container file and/or generates a container file for the quick start-up stream using the generated stream and/or the generated metadata (450). The container file for the quick start-up stream is the same and/or similar to the container file(s) generated for the alternative streams described above. The metadata for the quick start-up file is also added to the index file(s) for the streams (455). In accordance with some embodiments, the adding of the metadata of the quick start-up stream to the index file(s) includes metadata for the quick start-up stream to a top index file.

The encoding system may also add encryption information for the second encryption process to the index files (460). In accordance with some embodiments, the adding of the encryption information may include adding a decryption key for the second encryption process to an index file that includes the metadata for the quick start-up stream. In accordance with some other embodiments, the adding of the encryption information may include an identifier or a URL for a file containing the decryption key for the second encryption process.

One skilled in the art will recognize that although the generating of the streams (425), encrypting of the streams (430), generating of metadata (445), and generation of the container file (450) are shown as separate processes, the processes may be done simultaneously in accordance with some embodiments. Furthermore, One skilled in the art will recognize that although the generating of the streams (410), encrypting of the streams (415), generating of metadata (417), and generation of the container file(s) (420) are shown as separate from the corresponding process described above for the generating the alternative streams, the processes for the quick start-up stream and alternative streams may be performed simultaneously in accordance with some embodiments.

Although various processes for encoding alternative streams with a quick start-up stream are described above, one skilled in the art will recognize that other processes for encoding streams including a quick start-up stream may be performed in accordance with some embodiments of the invention.

Figure 5:
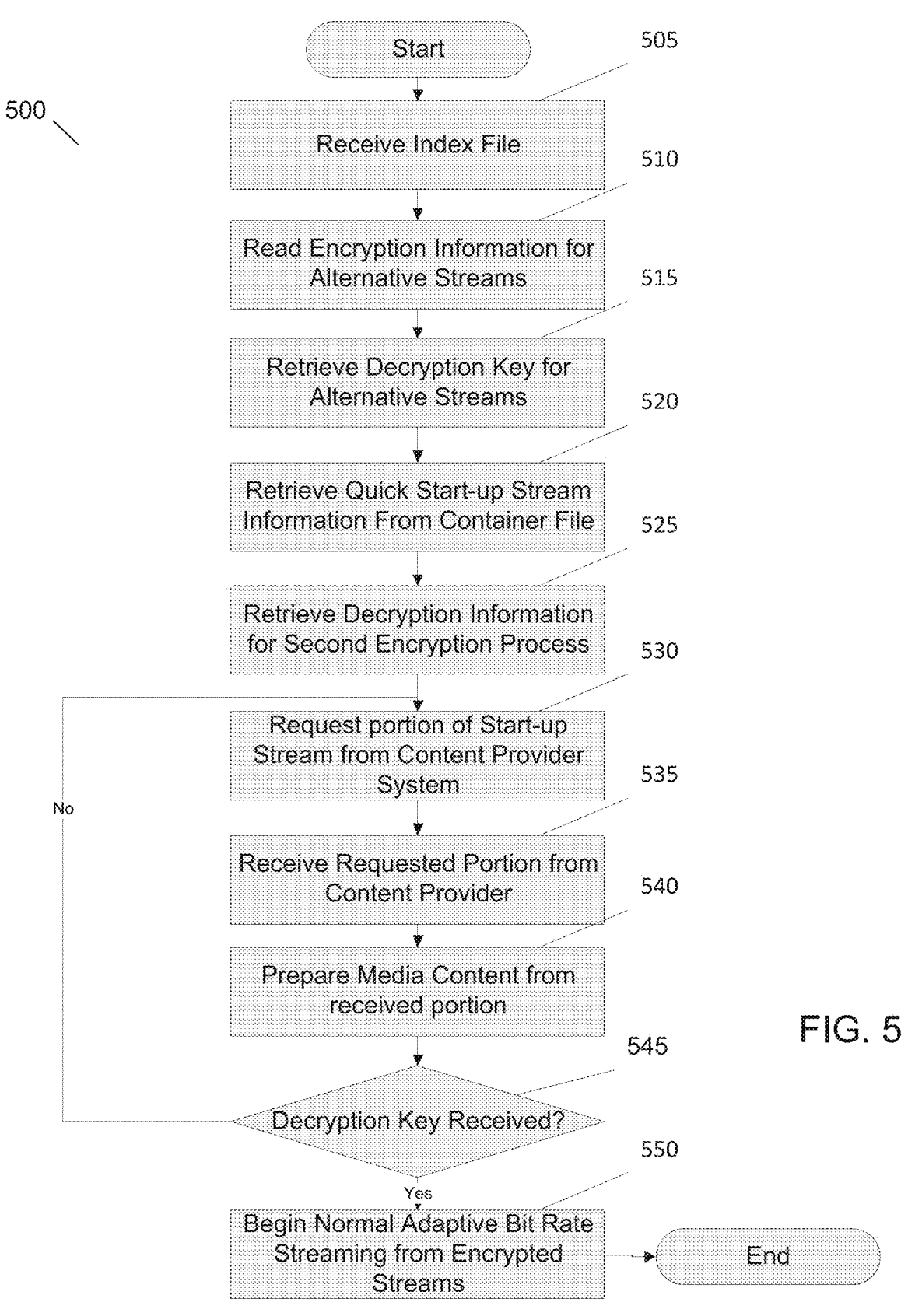
FIG. 5 illustrates a flow diagram of a process performed by a playback device using a start-up stream to begin playback of media content in accordance with an embodiment of the invention.

The quick start-up stream may be used by a playback device to more quickly load, decode, and start playback of media content while the playback device is preparing to decode the media content from the other alternative streams. In some embodiments, the quick start-up stream may be used to playback a beginning portion of the media content while the playback device completes the process of obtaining a decryption key for decrypting and decoding the media content in the other alternative streams. In many embodiments, the quick start-up stream may also be used to obtain media content to fill the buffer the playback device after a trick play command is performed. A process performed by a playback device to begin playback using a quick start-up stream in accordance with an embodiment of the invention is shown in FIG. 5.

In process 500, the playback device begins by receiving a top level index file for the media content (505). The playback device obtains the decryption/encryption information for the alternative streams of the media content (510). In accordance with some embodiments, the decryption/encryption information is read from the top level index file. In accordance with other embodiments, the encryption/decryption information is received from another source. The decryption/encryption information may be an identifier such as a URL or other type of pointer that directs the playback device to an authentication process provided by an authentication system and/or the content provider system. Based upon the decryption/encryption information, the playback device performs a process to obtain a decryption key (515).

The playback device also retrieves the quick start-up stream information from the top level index file (520). In accordance with some embodiments, the quick start-up stream is a URL to a container file containing the encoded video data of the quick start-up stream and/or the index file for the quick start-up stream. In many embodiments, the playback device may also obtain a decryption key or other decryption information from the top level index file, the index file of the quick start-up stream, and/or a decryption file in the container file of the quick start-up stream (525).

The playback device then begins streaming from the quick start-up stream container file. To do so, the playback device requests a portion of the media content (i.e. encoded audio, subtitles, and/or video data) of the quick start-up stream from the quick start-up stream container file (530). In accordance with some embodiments, the playback device begins by request the first portion of the quick start-up stream container file. In a number of embodiments, the playback device begins requesting portions of the quick start-up stream container file at a desired point within the stream such as, but not limited to, a current presentation point in media content after a trick play command has been performed. The playback device receives the requested portion from the container filer on a content provider system (535) and prepares the media content for play back (540). The preparation of the media content for playback may include decrypting the received portion and decoding the media content from the decrypted portion in accordance with many embodiments.

The playback device determines whether the decryption key for the other alternative streams has been received (545). In accordance with some embodiments, another metric may be used instead of or in combination with the reception of the decryption key such as, but not limited to, a specified amount of media content has been received or a predetermined amount of time has elapsed. If the decryption key has not been received and/or another metric has not been met, the playback device repeats the requesting (530), reception (535), and preparation (540) for playback of another portion of the quick start-up stream. If the decryption key has been received and/or another metric has been met, the playback device begins perform streaming with the other alternative streams in a conventional manner (550). Systems and methods for selecting a stream and commencing playback include those disclosed in U.S. Patent Application Publication 2013/0007200 entitled "Systems and Methods for Determining Available Bandwidth and Performing Initial Stream Selection When Commencing Streaming Using Hypertext Transfer Protocol" and U.S. Pat. No. 8,832,297 entitled "Systems and Methods for Performing Multiphase Adaptive Bitrate Streaming," the disclosures of which are hereby incorporated by reference in their entirety more particularly the processes performed by a playback device to obtain media content using adaptive bit rate streaming are incorporated herein by reference.

Although specific processes for starting playback using a quick start-up stream is discussed above with reference to FIG. 5, one skilled in the art will recognize that other processes for starting playback with a quick start-up stream may be performed in accordance with various embodiments of this invention.

Figure 6:
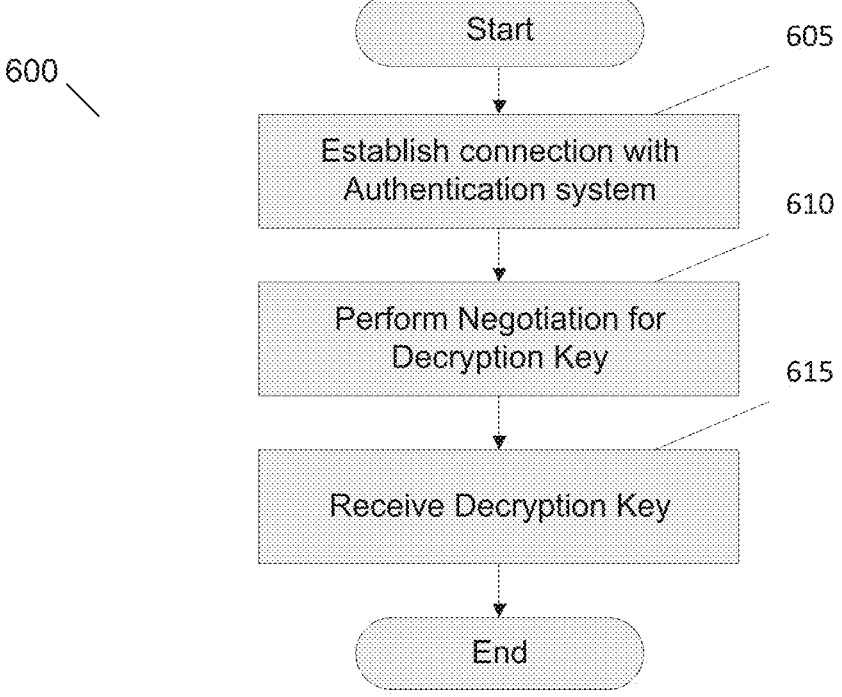
FIG. 6 illustrates a flow diagram of a process performed by a playback device to obtain an encryption key in accordance with an embodiment of the invention.

In order to obtain the decryption key for the alternative streams a playback device must negotiate for the key with the content provider system and/or a third party authentication system. A process performed by a playback device in accordance with an embodiment of this invention is shown in FIG. 6. Process 600 includes establishing connection with an authentication system (605). In accordance with some embodiments, the established connection is a secure connection over the network to assure confidential information cannot be obtained by third parties. The playback device then interacts with the authentication system to negotiate for the decryption key (610). In accordance with many embodiments, the negotiation may include the playback device providing certified and/or registration information to the authentication system and the authentication system verifying the information to authorize the playback device. Once the playback device is authorized, the authentication system provides the decryption key to playback device that receives the decryption key over the secure connection (615).

Although specific processes for obtaining a decryption key in accordance with an embodiment of the invention is disclosed in FIG. 6, other processes may be performed by a playback device to obtain a decryption key in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed:

1. A method for fast startup of video playback of encoded media content using at least two video streams, where the media is encoded as at least a first video stream and a second video stream, the method comprising:

receiving information for a quick start-up stream of a piece of media content in a playback device over a network;

commencing streaming of video content in the quick start-up stream from a content provider system over the network using the playback device;

determining an event has occurred using the playback device;

receiving information for a plurality of encrypted alternative streams of the piece of media content in the playback device over the network, where the plurality of encrypted alternative streams are encoded at different bitrates and the quality of video content in the quick start-up stream has a lesser quality than video content in at least some of the plurality of encrypted alternative streams;

commencing streaming of video content in one of the plurality of alternative streams from the content provider system over the network using the playback device in response to the determining that the event has occurred.

2. The method of claim 1, where the event is a decryption key is received.

3. The method of claim 2, where the decryption key is for at least one of the plurality of encrypted alternative streams.

4. The method of claim 1, where the event is that a predetermined amount of time has elapsed.

5. The method of claim 1, where the event is a specified amount of media content has been received.

6. The method of claim 1, where the quick start-up stream is not encrypted.

7. The method of claim 1, where the quick start-up stream is a portion of the piece of media content.

8. The method of claim 1, where the quick start-up stream is a lower resolution than the alternative streams.

9. The method of claim 1, further comprising retrieving a media presentation description (MPD) upon commencing streaming of video content in one of the plurality of alternative streams.

10. The method of claim 1, further comprising using the quick start-up stream to fill a buffer with media content after a trick play command is performed.

11. The method of claim 1, further comprising:

instantiating a first decoder to decode the quick start-up stream;

tearing down the first decoder and instantiating a second decoder to decode one of the plurality of alternative streams that is buffered during playback of video content by the first decoder.

12. The method of claim 1, wherein the plurality of alternative streams are encrypted using a first encryption process, wherein the method further comprises:

requesting a decryption key for the first encryption process from an authentication system over the network using the playback device;

receiving the decryption key for the first encryption process from the authentication system in response to requesting the decryption key; and determining that the event has occurred in response to the playback device receiving the decryption key.

13. The method of claim 1, wherein determining that the event has occurred comprises determining at least one of a specified amount of video content is received using the quick start-up stream and a certain amount of time has elapsed.

14. The method of claim 1 further comprising:

determining a specific portion of the media content is a start position for playback of the media content using the playback device; and wherein the playback device commences streaming the media content from the determined specific portion in the quick start-up stream.

15. A playback device comprising:

a memory;

a network interface; and a processor that reads instructions stored in the memory that direct the processor to:

receive information for a quick start-up stream of a piece of media content over a network;

commence streaming of video content in the quick start-up stream from a content provider system over the network;

determine an event has occurred;

receive information for a plurality of encrypted alternative streams of the piece of media content over the network, where the plurality of encrypted alternative streams are encoded at different bitrates and the quality of video content in the quick start-up stream has a lesser quality than video content in at least some of the plurality of encrypted alternative streams;

commence streaming of video content in one of the plurality of alternative streams from the content provider system over the network in response to the determining that the event has occurred.

16. The playback device of claim 15, where the event is a decryption key is received.

17. The playback device of claim 16, where for the decryption is for at least one of the plurality of encrypted alternative streams.

18. The playback device of claim 15, where the event is that a predetermined amount of time has elapsed.

19. The playback device of claim 15, where the event is a specified amount of media content has been received.

20. The playback device of claim 15, where the quick start-up stream is not encrypted.

21. The playback device of claim 15, where the quick start-up stream is a portion of the piece of media content.

22. The playback device of claim 15, where the quick start-up stream is a lower resolution than the alternative streams.

23. The playback device of claim 15, further comprising retrieve a media presentation description (MPD) upon commencing streaming of video content in one of the plurality of alternative streams.

24. The playback device of claim 15, where the processor is further directed to use the quick start-up stream to fill a buffer with media content after a trick play command is performed.

25. The playback device of claim 15, where the processor is further directed to:

instantiate a first decoder to decode the quick start-up stream;

tear down the first decoder and instantiate a second decoder to decode one of the plurality of alternative streams that is buffered during playback of video content by the first decoder.

26. The playback device of claim 15, wherein the plurality of alternative streams are encrypted using a first encryption process, the processor is further directed to:

request a decryption key for the first encryption process from an authentication system over the network using the playback device;

receive the decryption key for the first encryption process from the authentication system in response to requesting the decryption key; and determine that the event has occurred in response to the playback device receiving the decryption key.

27. The playback device of claim 15, wherein determining that the event has occurred comprises determining at least one of a specified amount of video content is received using the quick start-up stream and a certain amount of time has elapsed.

28. The playback device of claim 15, the processor is further directed to:

determine a specific portion of the media content is a start position for playback of the media content using the playback device; and wherein the playback device commences streaming the media content from the determined specific portion in the quick start-up stream.

* * * * *